Patented June 8, 1954

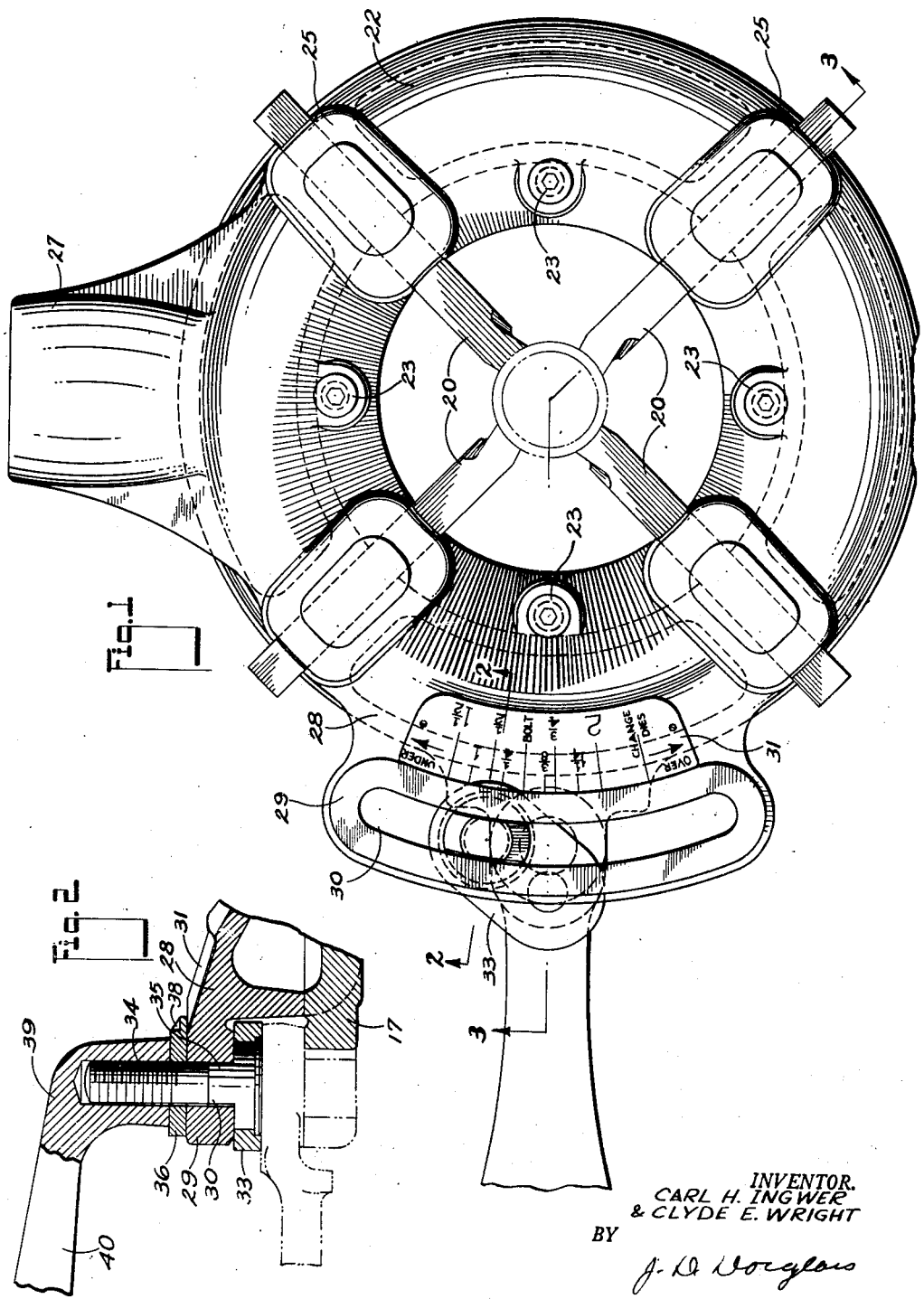

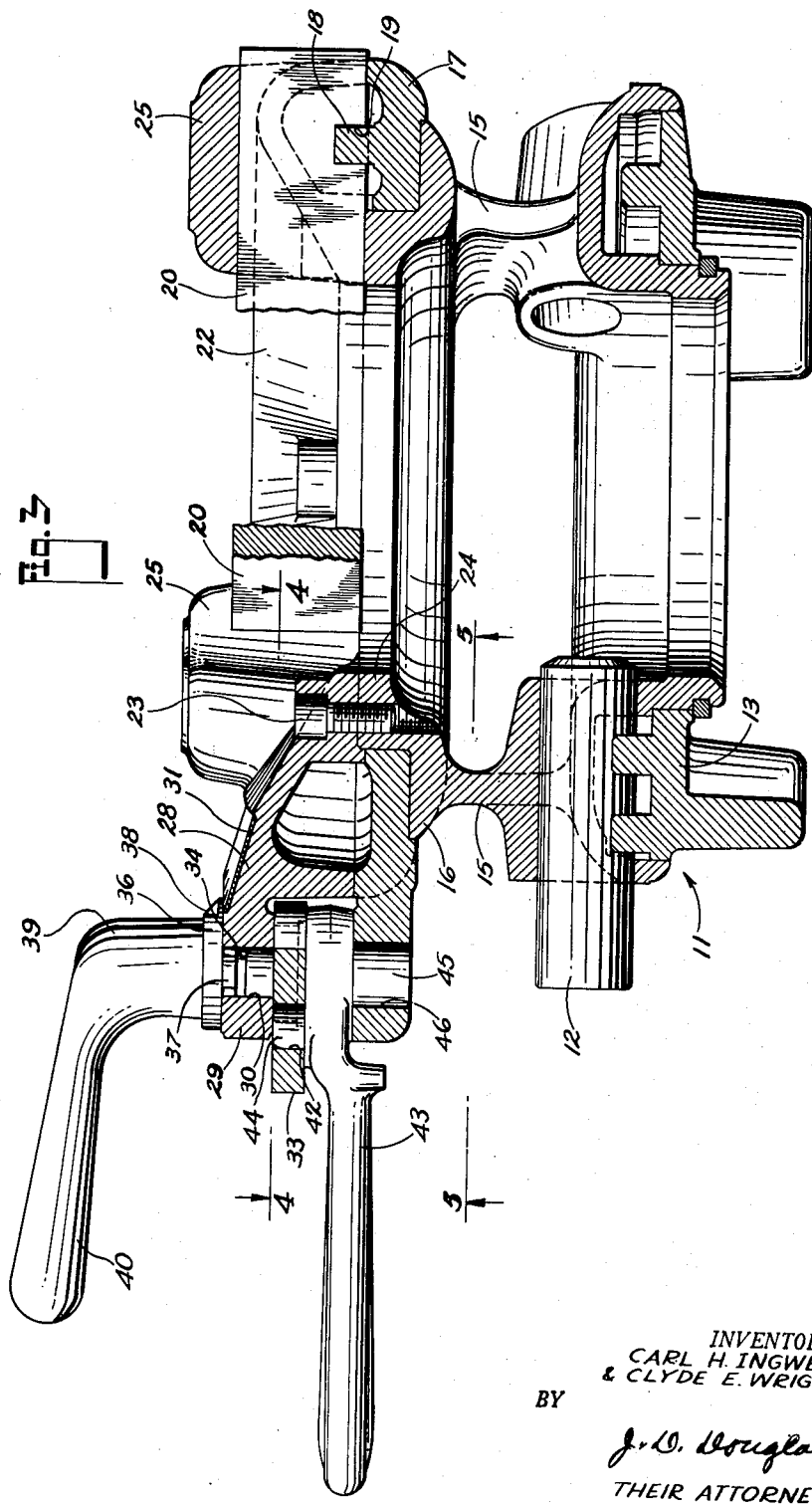

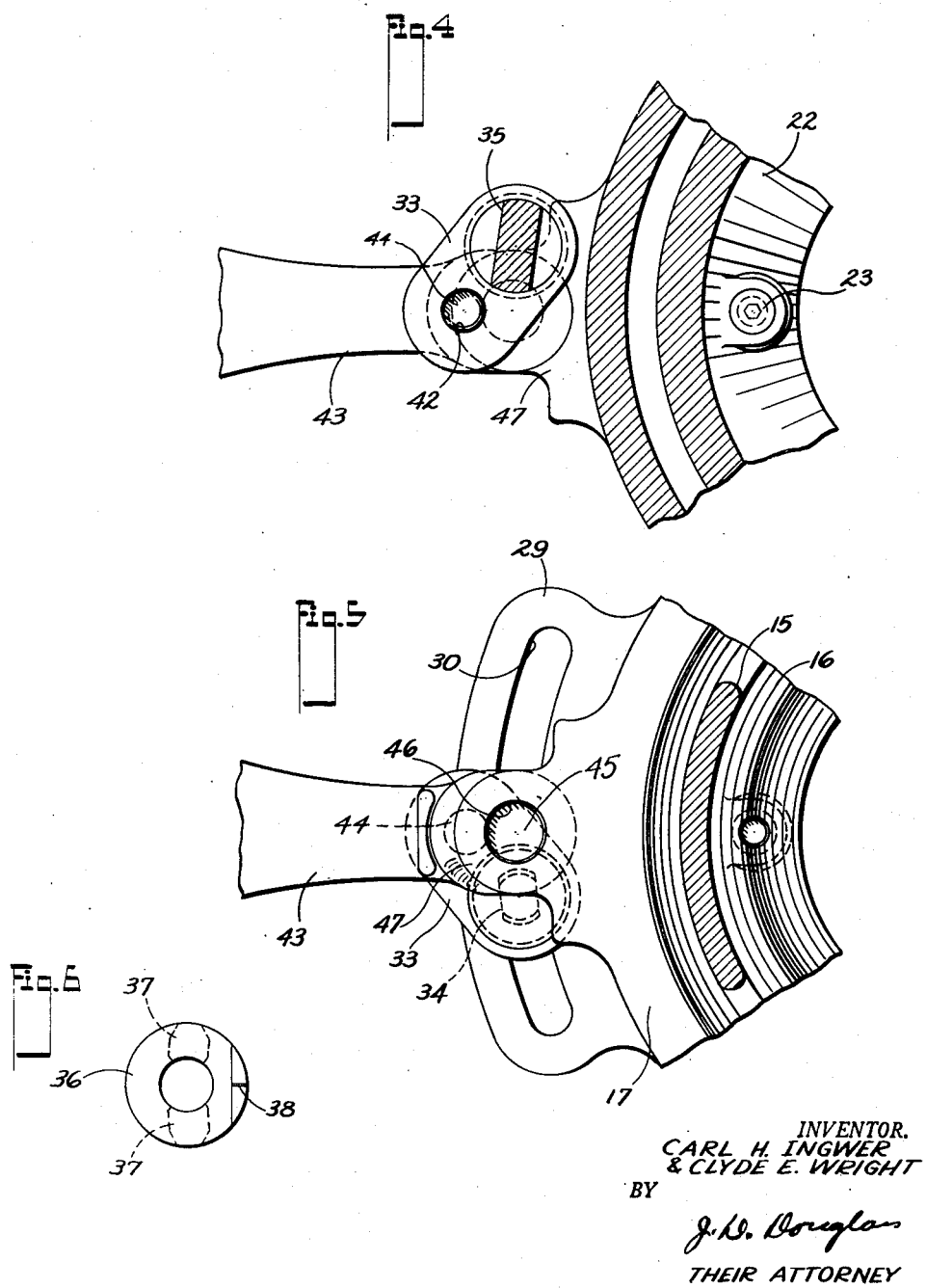

2,680,256

UNITED STATES PATENT OFFICE 2,680,256

ADJUSTABLE THROWOUT MEANS FOR DIEHEADS

Carl H. Ingwer and Clyde E. Wright, Elyria, Ohio, assignors to The Ridge Tool Co., Elyria, Ohio Application May 27, 1950, Serial No. 164,678

2 Claims. (Cl. 10—122)

This invention pertains to thread cutting tools, and more particularly to a throwout means for thread chasers of a pipe or bolt threading device.

In threading tools adapted to thread pipe or bolts, and particularly in those which are used in conjunction with a power driven device, it is almost essential that means be provided to release the thread cutting chasers when the end of the desired threaded length is reached. This prevents cutting too many threads and eliminates the need for reversing the operation after cutting to remove the tool from the pipe or bolt.

Nearly all throwout means are operated by a cam plate which is formed with individual cams engaging each chaser. As the chaser is moved relative to the cam, it is withdrawn from or moved toward the work by action of the cam. The relative movement has been produced, both by a linkage means and by a separate cam means adapted to move either the chasers or the cam plate.

In addition to a throwout means, it is customary to make the threading machine adjustable to be used with several sizes of work piece. An approximate adjustment is made by a change of chasers which may be longer or shorter to accommodate different sizes of work, and the fine adjustment by movement of the cam plate relative to the chasers. Customarily, a single set of chasers is used for two sizes of pipe, which is another reason for the adjustability of the cam relative to the chasers. It is also possible, with this type of device to cut over or under size threads.

In prior devices, in order to adjust the cam plate, it was necessary to release a clamping device, move one part relative to another and clamp it again, but always, the throwout device had to be set for the working operation. If it were set in any other position, even slightly out of the working position, the device would be improperly adjusted. This made unusual care necessary in setting or resetting the device for varied sizes.

Another undesirable feature of the devices of the prior art was the provision of a plurality of lubber lines, each having one or two index lines which were aligned with the proper lubber line to adjust the device. This required considerable searching on the part of the operator to determine the proper lubber line and proper index line in order to align them. Since the lines were scribed on the side or edge of the device, they were frequently difficult to find, often being on the under side of the device and also frequently covered with cutting oil.

By our invention, we eliminate many of the difficulties found in previous devices. By provision of a new type of linkage and adjustment means, it is possible to adjust the device irrespective of the position of the throw-out mechanism. This is accomplished by adjusting the throw-out mechanism along with the cam plate relative to the chasers and indexing the device at the same point where the adjustment is made and which point is then fixed by clamping. Since the initial pivoting point of the throw-out mechanism is always at a fixed adjusted position for a given size of work piece in our device, it is immaterial in which position that mechanism is when the device is adjusted. In addition, because of this type of linkage, the adjustment markings can be placed in a prominent place on the device, and these markings require the use of only a single lubber line which may be adjusted to any of a plurality of index lines for the different sizes.

A more complete understanding of the invention may be had by referring to the accompanying description of an embodiment thereof and the figures in which:

Fig. 1 is a top plan view of a pipe threader with the locking lever and index washer removed;

Fig. 2 is a sectional view along line 2—2 of Fig. 1;

Fig. 3 is a sectional view from line 3—3 of Fig. 1;

Fig. 4 is a detailed partial sectional view from the line 4—4 of Fig. 3;

Fig. 5 is a detailed partial plan view from line 5—5 of Fig. 3; and

Fig. 6 is a detailed plan view of the index washer alone.

Briefly, our invention comprises a threading tool having a guide portion and a cutter carrier plate rigidly fixed together with a cam plate movably disposed between them. The chasers are slidably disposed in the carrier plate and are moved by means of cams formed on the cam plate. Movement of the cam plate is controlled by a throwout linkage pivoted between the cam plate and the carrier plate. The adjustment for varied sizes of work is made and indexed at the point where the linkage is pivoted to the carrier plate. Thus the entire linkage is adjusted to a given position relative to the carrier plate and the relative position of the individual links is unimportant, since they can be moved to the proper position after the adjustment is completed. An index plate is placed on the face of the carrier plate and a lubber line is used in conjunction with the linkage member which serves as a pivot so that a single lubber line is sufficient and the graduations are readily visible.

More specifically, and with reference to the drawings, the threader in the illustrated embodiment comprises a workholder or guide portion 11, Fig. 3, having jaws 12 adjutsable by means of a cam device 13 in a manner well known in the art. It is conceived that the workholder 11 may be omitted from the device for some purposes and such a device is, therefore, not beyond the scope of this invention. Extending from the workholder 11 are legs 15 which support a ring 16. A cam plate 17 is rotatably journalled on the ring 16. Ribs 18 in the form of spiral cams extend upwardly into grooves 19 in the chasers 20 to move them in a manner well known in the art. A carrier plate 22 is fastened to the ring 16 by screws 23 which extend into the shoulder 24 on the ring 16 within the cam plate 17.

The chasers 20 are slidably disposed in chaser housings 25 formed on the carrier plate 22. As noted above, they are held in place by the cam ribs 18. The carrier plate 22 is also formed with a threaded socket in the boss 27 into which a length of pipe may be screwed to provide a handle by which the device is turned. It will be evident to those skilled in the art that two handles could be provided or that a common type tooth and ratchet means could be provided around the body of the tool at the legs 15 or thereabouts, to drive the tool, or that any of several means for attaching the device to a power tool may be used.

An upraised boss 28 is formed in the carrier plate 22 between two of the chaser housings 25. This boss includes a portion 29 extending beyond the limits of the cam plate 17 and lying substantially parallel to the carrier plate 22. An arcuate slot 30 is formed in the portion 29 and an indexing plate 31 is fixed to the sloping portion of the boss 28 adjacent to the slot. This plate 31 bears indicia of the pipe sizes and notations as to the use of the device.

A link 33 is adjustably fastened to the extending portion 29 by a special bolt 34. This bolt is formed with a part 35 adapted to extend into the slot 30 to prevent the bolt from turning. The head of this bolt on which the link 33 is pivoted is of sufficient thickness to engage the lower surface of the portion 29 before clamping the link tight. Thus the link 33 is always freely movable on the head of the bolt whether the bolt is tightened or not. A special washer 36 having depending portions 37 extending into the slot 30 is provided above the portion 29 of the boss 28. This washer also is marked with a lubber line 38 extending toward the index plate 31. A clamping nut 39 is threaded onto the bolt and is adapted to be screwed down against the washer 36 to hold the link in its adjusted position. The clamping nut 39 is formed with a handle 40 to provide convenient means for screwing the nut down tight.

At the end of the link 33 (Fig. 4) opposite the bolt 34, a hole 42 is formed. The second link of the linkage is formed by a throwout lever 43 having one boss 44 on its upper surface, journalled in the hole 42. Another boss 45 is formed on the lower surface of the lever 43 displaced somewhat from the first named boss 44. This second boss 45 is journalled in a hole 46 formed in an ear 47 on the cam plate 17. Because of the broad surfaces of the link 33, ear 47 and the surfaces of the lever 43, no screws or other holding means are necessary to support the lever 43 in its place in the linkage.

In operation, the work holder 11 is set for the proper size work piece. Chasers 20, which are customarily suited to two sizes of pipe depending on the adjustment of the device, are chosen for the proper size. The adjustment device is then loosened and moved so that the lubber line 38 on the washer is opposite the index line marked "change dies" (Fig. 1). This moves the cam plate 17 around to a point where the chasers may be freely inserted in a manner well known in the art. After insertion of the chasers, the adjustment means is moved, causing the cam ribs 18 to engage the grooves 19 in the chasers and adjust them. The lubber line is then placed opposite the line for the appropriate indicia for the size of work to be threaded, and the adjustment device is clamped down.

The lever 43 is then set to the operating position, which is that position in which the chasers are most fully extended inward, and the threads are cut in a manner well known. This position of the handle would be about 90 degrees rotated downward from the position shown in Fig. 1. The handle in that figure as well as Figures 4 and 5 is shown in a mid-position of its swing and would normally never be used in that position. To release the chasers, the lever 43 is moved through approximately 180 degrees to its opposite position approximately 90 degrees above the position shown in Fig. 1. This movement causes the cam plate 17 to rotate and withdraw the chasers 20. It is apparent that such movement of the lever 43 will move the ear 47 on the cam plate a distance approximately twice the distance between centers of the bosses 44 and 45 on the lever 43. This movement of the cam plate is sufficient to withdraw the chasers from the threads. The device may then easily be removed from the pipe or bolt merely by sliding it off.

It will be further apparent that, because the pivot point of the linkage at the stationary plate 22 is, at the same time, an adjustable point and the point at which the indexing is accomplished, no care need be taken to position the lever 43 in a particular position before adjustment is made. This is true because, once the pivot point is fixed at a given position in the slot 30, the linkage is fixed and the end points of the travel of the linkage are the same irrespective of the initial points. Thus, the ear 47 of the cam plate 17 will always be at the same point for a given position of the lever 43 if the bolt 34 is set to a given spot in the slot 30. This is not true of prior devices where the adjustment was always made at the cam plate, whereas the device was indexed by lines scribed on the cam plate and the body of the machine. Therefore, the lever always had to be in the closed position when adjusting or the adjustment was wrong, for when the lever was moved after adjustment, the cam plate moved relative to the body and the device was no longer properly adjusted.

Further advantages are gained from our construction in that by adjusting the linkage at the stationary plate, it is possible to use an indexing plate on the face of the device where it is more visible than on prior devices. And it is possible to use only a single lubber line which can be adjusted to any of the several index lines for a full range of adjustments.

Having thus described our invention, we are aware that numerous and extensive departures may be made therefrom without departing from the spirit or scope of our invention.

We claim:

1. In a thread cutting device having a carrier plate formed with housings, chasers slidably mounted in the housings and a cam plate having cams to control the chasers; throw-out means for said chasers comprising a throw-out lever pivotally engaged with said cam plate, a link pivoted at one end to said lever about a center displaced radially outwardly from the pivot center between said lever and said cam plate, bolt means extending through the other end of said link and through slot means formed in said carrier plate, a washer carried by said bolt means having portions engaged in said slot to hold it against turning relative to said carrier plate and formed with a lubber line thereon, an index plate mounted on said carrier plate adjacent said slot bearing indicia to which said lubber line may be adjusted to facilitate adjustment of the cam plate to adjust said chasers for different sizes of workpieces, and a clamping nut threadably disposed on said bolt.

2. In a thread cutting device having a carrier plate adapted to carry chasers and a cam plate having cams adapted to control the chasers; throw-out means comprising a lever formed with a boss on one side journalled in a hole formed in said cam plate, a boss formed on the other side of said lever displaced radially outwardly from said first named boss, said lever being formed about said bosses to provide flat bearing surfaces, a link rotatably journalled on said second boss at one end and adjustably pivoted to said carrier plate at the other end to facilitate adjustment of the cam plate to adjust said chasers for different sizes of workpieces, the engagement between said cam plate and said link with said bosses and said bearing surfaces being such that said lever is held in place thereby.

References Cited in the file of this patent

UNITED STATES PATENTS

| Number | Name | Date |
|---|---|---|
| 638,601 | Seren | Dec. 5, 1899 |
| 682,774 | Wieland | Sept. 17, 1901 |
| 1,044,808 | Oster | Nov. 19, 1912 |
| 1,289,721 | Fisher | Dec. 31, 1918 |
| 1,644,143 | Nonneman | Oct. 4, 1927 |

FOREIGN PATENTS

| Number | Country | Date |
|---|---|---|
| 556,008 | France | Sept. 13, 1922 |
| 388,666 | Great Britain | Mar. 2, 1933 |
| 393,072 | Great Britain | June 1, 1933 |